(12) United States Patent
Orun et al.

(10) Patent No.: US 9,659,303 B2
(45) Date of Patent: May 23, 2017

(54) SYSTEM AND METHOD FOR HANDLING GAMIFICATION FRAUD

(71) Applicant: salesforce.com, inc., San Francisco, CA (US)

(72) Inventors: Mehmet Orun, San Francisco, CA (US); Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 177 days.

(21) Appl. No.: 14/226,475

(22) Filed: Mar. 26, 2014

(65) Prior Publication Data

US 2014/0304054 A1 Oct. 9, 2014

Related U.S. Application Data

(60) Provisional application No. 61/807,870, filed on Apr. 3, 2013.

(51) Int. Cl.
*G06Q 30/00* (2012.01)
*G06Q 30/02* (2012.01)

(52) U.S. Cl.
CPC ................ *G06Q 30/0225* (2013.01)

(58) Field of Classification Search
CPC .................................................. G06Q 30/0225
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |

(Continued)

*Primary Examiner* — Amanda Abrahamson
*Assistant Examiner* — Scott C Anderson
(74) *Attorney, Agent, or Firm* — Dergosits & Noah LLP; Todd A. Noah

(57) ABSTRACT

Some embodiments of the present invention include determining if updates performed by a second user include a systematic change such as a reversal of an update previously performed by a first user within a time window. The reversal is associated with a record of data used by a gamification application executing in a computer system. A time delay is introduced between the update performed by the second user and rewarding the second user if the update performed by the second user includes the reversal within the time window. An update history of the first user and the second user is evaluated to identify pattern of reversals associated with similar records within the time window. The second user is prevented from being rewarded based on identifying that there are patterns of reversals from the update history occurring within the time window.

20 Claims, 11 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,015,495 B2 | 9/2011 | Achacoso et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,484,111 B2 | 7/2013 | Frankland et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0174075 A1* | 11/2002 | Mirlas ................ G06Q 20/02 705/78 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0133526 A1* | 7/2004 | Shmueli .............. G06Q 50/188 705/80 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0004655 A1* | 1/2006 | Alexander ............ G06Q 20/00 705/39 |
| 2009/0063415 A1 | 3/2009 | Chatfield et al. |
| 2010/0179855 A1* | 7/2010 | Chen ................ G06Q 10/063 705/7.31 |
| 2011/0016379 A1* | 1/2011 | McColl ................ G06F 17/246 715/219 |
| 2012/0036003 A1* | 2/2012 | Tong ................ G06Q 30/0207 705/14.39 |
| 2012/0321146 A1* | 12/2012 | Kundu ................ G06Q 20/202 382/118 |

\* cited by examiner

| Object ID 601 | Version Number 602 | Create Date 603 | Created By 604 | Action 605 |
|---|---|---|---|---|
| 630 — 1 | 5 | 1/31/2012 | User 4 | Inactivate |
| 631 — 1 | 4 | 1/24/2012 | User 3 | Activate |
| 632 — 1 | 3 | 1/8/2012 | User 2 | Inactivate |
| 633 — 1 | 2 | 10/1/2011 | User 3 | Update |
| 634 — 1 | 1 | 4/1/2011 | User 1 | Add |
| 635 — 2 | 3 | 1/25/2012 | User 3 | Activate |
| 636 — 2 | 2 | 1/12/2012 | User 2 | Inactivate |
| 637 — 2 | 1 | 6/1/2011 | User 5 | Add |

| Object ID | Last Version Number | Nth User | N-1 User | Time Between N & N-1 | N to N-1 Action | N-2 User | Time Between N-1 & N-2 | N-1 to N-2 Action |
|---|---|---|---|---|---|---|---|---|
| 680— 1 | 5 | User 4 | User 3 | 7 days | Inactivate | User 2 | 16 days | Activate |
| 681— 1 | 4 | User 3 | User 2 | 16 days | Activate | User 3 | 99 days | Update |
| 682— 1 | 3 | User 2 | User 3 | 99 days | Update | User 1 | 183 days | Add |
| 683— 2 | 3 | User 3 | User 2 | 13 days | Activate | User 5 | 216 days | Add |

*FIG. 6B*

SYSTEM AND METHOD FOR HANDLING GAMIFICATION FRAUD

CLAIM OF PRIORITY

This application claims priority to Provisional U.S. Patent App. No. 61/807,870, filed on Apr. 3, 2013, entitled "SYSTEM AND METHOD FOR HANDLING GAMIFICATION FRAUD" by Orun et al., which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically to detecting fraudulent activities by users of data processing systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Gamification refers to techniques that reward users or players for accomplishing or engaging in certain activities. Gamification encourages competition among the users and uses that competition to cause the users to accomplish the desired activities while feeling like they are playing games. Some users have attempted to circumvent the rules by pretending to perform the activities and then fraudulently collect the rewards. Accordingly, it is necessary to be able to detect and prevent those users from such activities to preserve the integrity of the desired activities.

BRIEF SUMMARY

For some embodiments, methods and systems to detect gamification frauds include introducing a time delay before a user is allowed to collect reward for performing actions associated with an application. The time delay enables reviewing action history to determine if there is potential fraud collaboration between a first user and a second user. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques for integrating on-demand applications and remote jobs. These drawings in no way limit any changes in form and detail that may be made to embodiments by one skilled in the art without departing from the spirit and scope of the disclosure.

FIG. 4B is another example webpage of an application configured with gamification, in accordance with some embodiments.

FIG. 6A shows an example action history table that includes the actions performed by a group of users, in accordance with some embodiments.

FIG. 6B shows an example flattened action history table, in accordance with some embodiments.

DETAILED DESCRIPTION

Figure 1:
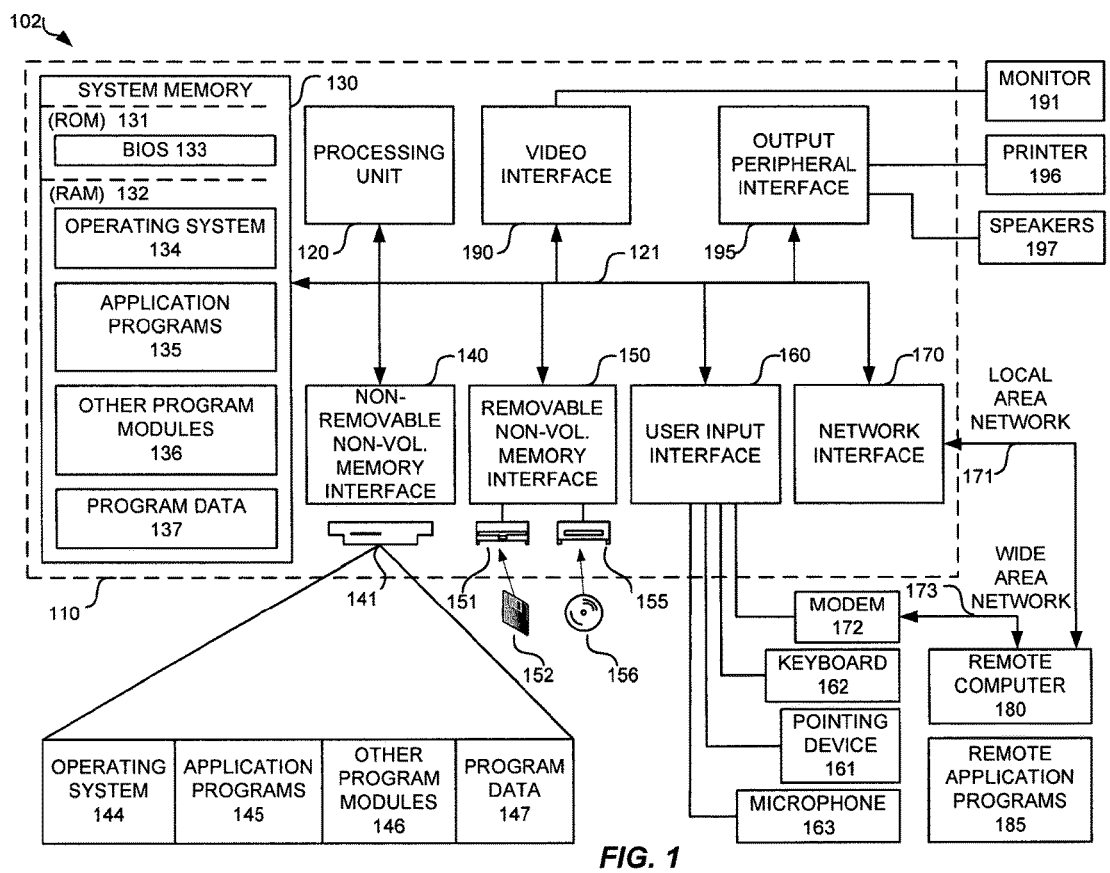
FIG. 1 is a diagram of an example computer system that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The disclosed embodiments may be related to handling gamification fraud for use in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include systems configured to provide rewards to users for performing certain activities. The rewards may be in the form of points or online currency. The points or online currency may be converted to cash. The process of providing the rewards for performing certain activities in an application may be referred to herein as gamification. A fraud detection module may be configured to detect fraudulent activities by a user in order to collect the rewards. The fraud detection module may detect the fraud based on one or more patterns of data updates by the user. The fraud detection module may introduce a time delay as a result of the detection. The time delay may be used to prevent the user from collecting the rewards based on the fraudulent activities.

The disclosed embodiments may include methods for detecting and preventing fraudulent activities by a user in order to collect the rewards. The methods may detect behaviors and activities of a first user and a collaborating second user to determine whether their activities may constitute fraud. The behaviors and activities may include causing mass changes or updates to records in a database by the first user and reverting the changes or updates by the second collaborating user. The methods may then introduce a time delay to prevent the second collaborating user from collecting the rewards. For some embodiments, the first user and the second user may be the same user using a first user account and a second user account. For some embodiments, the actions of the first user and the second user may be of human user or they may be performed by a software application.

The disclosed embodiments may include methods for determining if an update performed by a second user includes a systematic change of an update previously performed by a first user within a time window. The systematic change may be associated with a record of data used by a gamification application executing in a computer system. The methods may also include introducing a time delay between the update performed by the second user and rewarding the second user if the update performed by the second user includes the systematic change within the time window. The update history of the first user and the second user may be evaluated to identify pattern of systematic changes associated with similar records within the time window. The second user may be prevented from being rewarded based on identifying the pattern of systematic changes within the time window.

FIG. 1 is a diagram of an example computer system that may be used with some embodiments of the present invention. The computing system 102 may be used by a user to participate in the gamification. The computer system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, minicomputers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures. herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD- ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computer system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
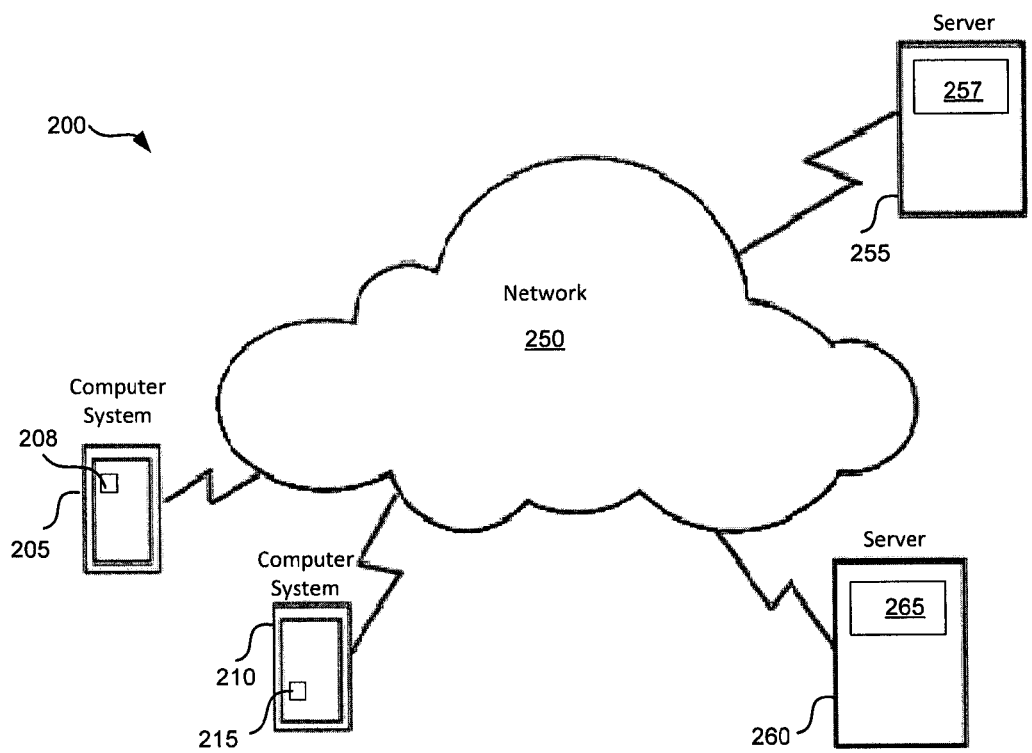
FIG. 2 is a diagram of an example network environment that may be used with some embodiments of the present invention.

FIG. 2 is a diagram of an example network environment that may be used with some embodiments of the present invention. Diagram 200 includes mobile computing systems 205 and 210 which may be connected to the network 250 via a cellular connection or via a Wi-Fi router (not shown). The network 250 may be the Internet. The mobile computing systems 205 and 210 may be coupled with one or more server computing systems 255 and 260 via the network 250. A user may use the mobile computing system 205 and local application 208 to connect to the server computing system 255 and log into the application 257 to perform certain gamification-related activities. Similarly, a user may use the mobile computing system 210 and local application 215 to connect to the server computing system 260 and log into the application 265 to perform certain gamification-related activities. The applications 257, 265 may be referred to as gamification applications. The server computing systems 255 and 260 may be associated with a corporation. Although not shown, there may be multiple applications running in the computing systems 205, 210.

Figure 3:
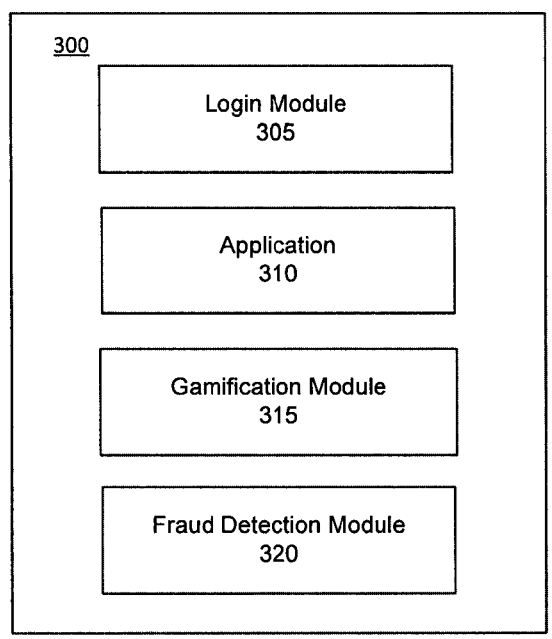
FIG. 3 is a block diagram that illustrates example functional modules of a server computing system, in accordance with some embodiments.

FIG. 3 is a block diagram that illustrates example functional modules of a server computing system, in accordance with some embodiments. Server computing system 300 may include many of the functional modules described in FIG. 1 and may also include a login module 305, an application module 310, a gamification module 315, and a fraud detection module 320. The log in module 305 may be configured to enable a user using a computer system (e.g., computer system 205 shown in FIG. 2) to log in to the server computing system 300. The application module 310 may be configured to enable a user to interact with an application once the user has successfully logged in to the server computing system 300. The application module 310 may be associated with the gamification module 315 to engage the user to interact with the application using gaming techniques. Rewards such as points or virtual money may be collected by the user for performing activities managed by the gamification module 315. The fraud detection module 320 may be associated with the gamification module 315 and may be configured to detect fraudulent activities by any user to collect the rewards. The fraud detection module 320 may be configured to track the browsing behavior of a user, and the subsequent action by the user based on the browsing behavior. For example, the fraud detection module 320 may detect that the user browses an address field of a record, and then the user performs an update action to the address field. The fraud detection module 320 may then determine if the pattern of actions and the effect on the related data may rise to the level of a potential fraud. Other functions of the fraud detection module 320 are also described in other parts of this document. Although the fraud detection module 320, the gamification module 315 and the application module 310 are shown as separate modules, the functionalities of two or more these modules may be combined.

Figure 4A:
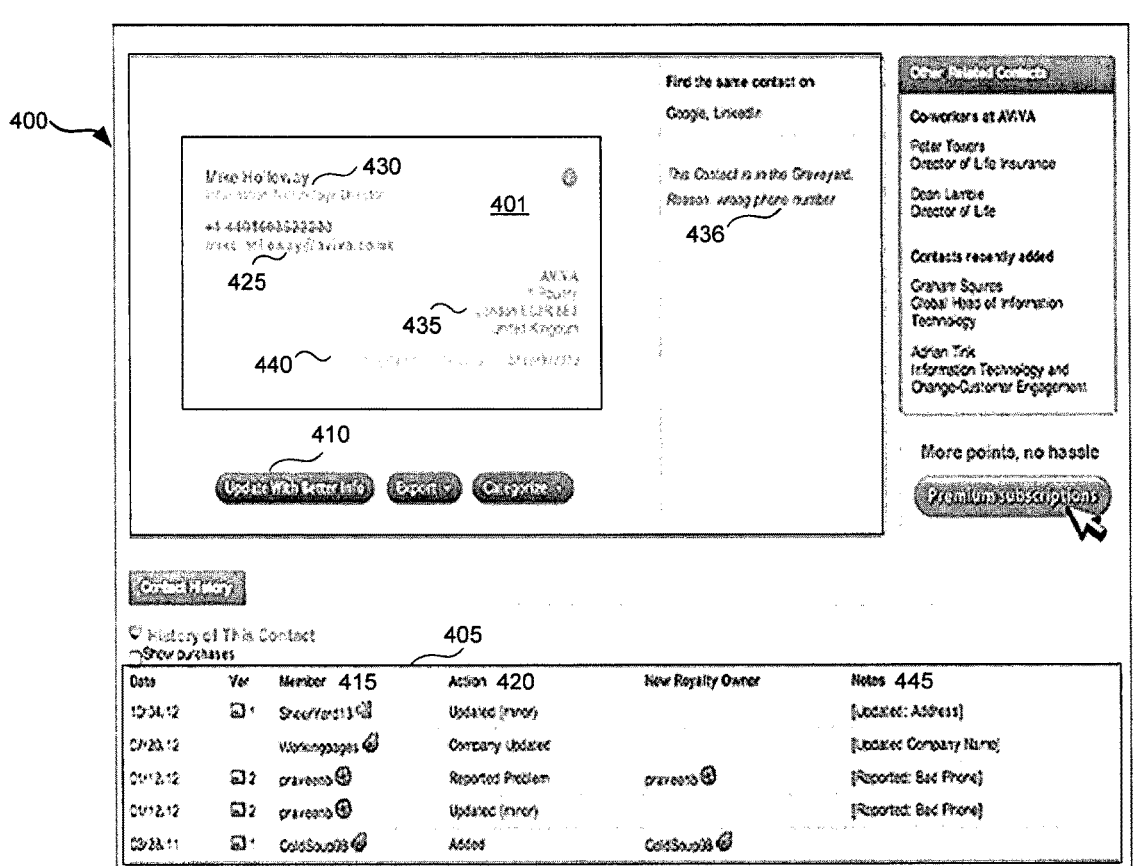
FIG. 4A is an example webpage of an application configured with gamification, in accordance with some embodiments

FIG. 4A is an example webpage of an application configured with gamification, in accordance with some embodiments. The webpage 400 shows record id information 401 of an entity. The entity may be a person or a company. The record id information 401 may include a title or name field 430, a phone number field 425, an address field 435, and an updater field 440. The record id information may be updated by a user and reward may be collected for each update. History section 405 shows a history of the updates and the users who performed the updates. To update, the user may modify one or more fields of the record id information 401 and select the update button 410. Included in the history section 405 are the userid 415 of the users who performed the updates, the corresponding update action 420, and the action description (or notes) 445. The updater field 440 shows the userid of the user who performed the most recent update.

The record id information 401 and its various fields may be stored as a record in a database. The record id information 401 may include information that may not be up-to-date. For example, the phone number field 425 may not be correct. A user may flag or report that field as incorrect, and the contact information 410 may be flagged accordingly. For example, the contact information 410 may be placed in the "graveyard" status 436 because of the incorrect phone number. In the current example, the user having the userid "SheerYard13" identified the incorrect information, and that userid is reflected in the history section 405 and in the updater field 440.

Figure 4B:
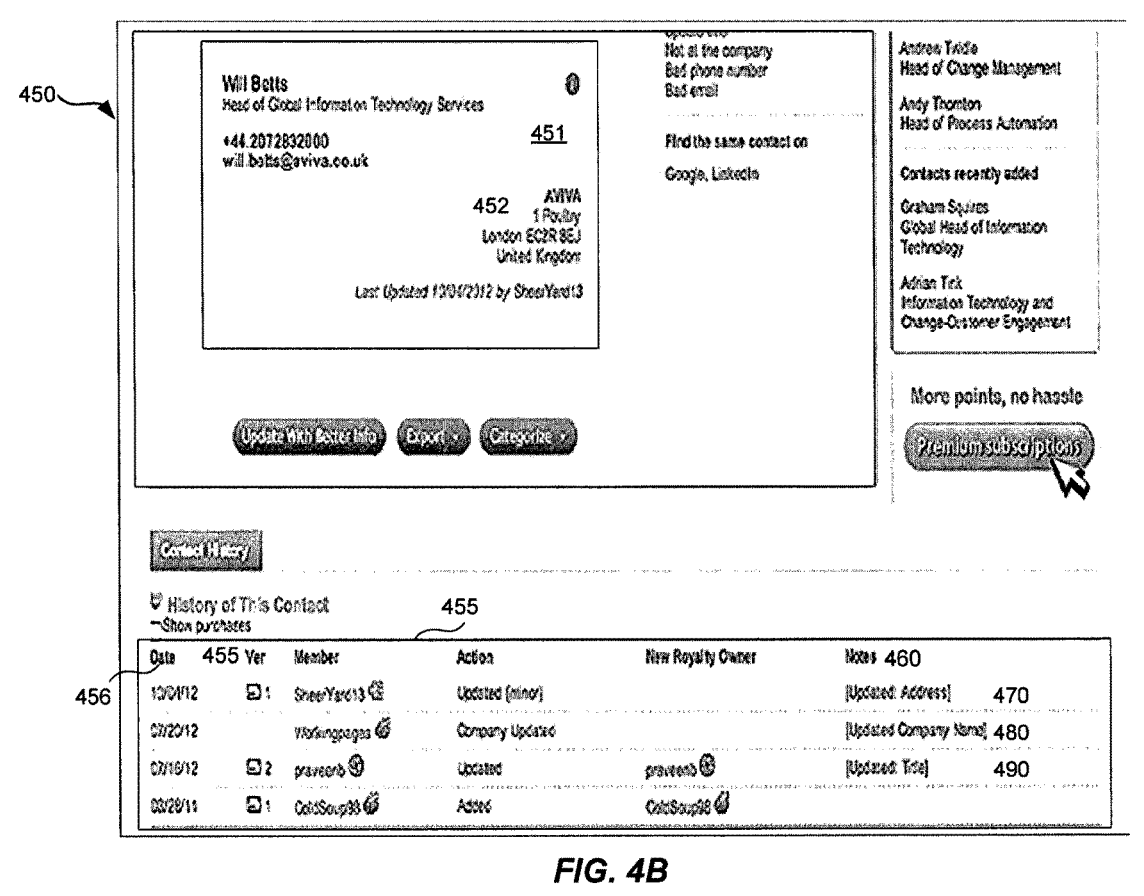

FIG. 4B is another example webpage of an application configured with gamification, in accordance with some embodiments. The webpage 450 shows record id information 451 of a different record id from the record id shown in FIG. 4A. The webpage 450 also shows actions performed by different users in the history section 455. The updates may not follow a particular pattern. For example, the first user may change the title of a file or swap content of a first address line with a second address line of the address field 452. The updates or changes may be across multiple categories of content such as, for example, information technology, marketing contacts, executives, and individual contributors. This can indicate a non-fact based driven update behavior. Each update may correspond to a version number 455 and a date 456. For example, under the action description 460, the history shows title update 490, company name update 480 and an address update 470, with each update action performed by a different user.

Figure 5:
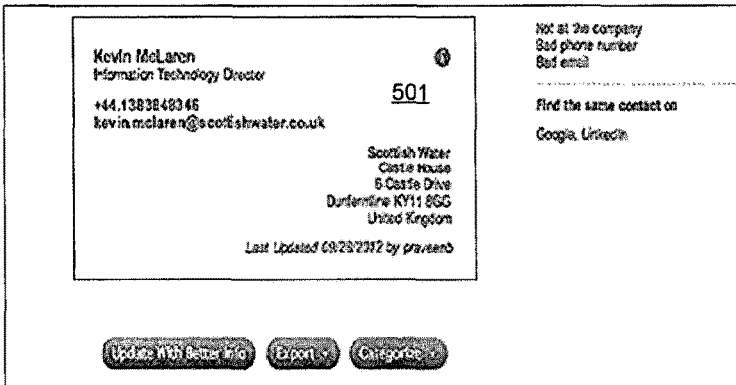
FIG. 5 is another example webpage of an application configured with gamification, in accordance with some embodiments.

FIG. 5 is another example webpage of an application configured with gamification, in accordance with some embodiments. The webpage 500 shows record id information 501 of a different record id from the record id shown in FIGS. 4A and 4B. The webpage 500 also shows actions performed by different users in the history section 505. For example, under the action description 550, the history shows bad phone number flagging 597, phone number update 596, an address update 595, company update 590, phone update 580, bad email address flagging 570, and update email address 560 (removing the record id from the "graveyard" status). Each update may correspond to a version number 555 which identifies the version of the record id information 501, and a date 556 which identifies when (e.g., date and/or time) the record id information 501 is updated. Each of these updates may result in the corresponding user collecting online currency or points. The users may cash the rewards immediately after the updates.

Two users may collaborate to fraudulently collect the rewards by making updates and then reversing the updates. Subsequent to the actions of the first user, a second user or groups of users may start acting on the records updated by the first user. For example, the action description 597 shows the first user flagging that the phone number in the record id information 501 is incorrect causing the record id information 501 to be placed in the "graveyard" status. The second user then updates the phone number (shown as action description 596) with the correct phone number and thus removing the record id information 501 from the "graveyard" status. The first user may perform multiple actions to make mass changes, and then one or second users may update or flag the actions of the first user. For example, the first user may modify the record id information 501 by updating the address information (shown as action description 595) and then updating multiple fields of the company information (shown as action description 596). A second user may then update the phone number (shown as action 580), and then flag that the address is incorrect (shown as action 570) causing the record id information 501 to be placed in the "graveyard" status. A third user may update the address (shown as action 560) and removing the "graveyard" status. As shown, multiple users may collaborate with one user making the updates and two or more users reversing the updates.

It may be possible that the corrective actions are performed by a legitimate user correcting the fraudulent actions of the first user. As such, the fraud detection module 320 (shown in FIG. 3) needs to be able to differentiate whether the second user is a collaborator of the first user or a user performing legitimate corrective actions. Information known about the second user as well as the patterns the second user looks for in correcting the actions of the first user may help differentiate between a fraudulent second user and a legitimate second user.

For some embodiments, when the fraud detection module 320 detects that the second user first browses the records updated by the first user, then looks up the update history of the first user, and then start performing the updates, the fraud detection module 320 may conclude that the second user is a legitimate user and the intention is likely good. For some embodiments, when the fraud detection module 320 detects that the second user starts performing multiple update actions without first performing some related browsing actions, then the second user may be a fraudulent user. The actions of the second user in this situation implies the second user knows ahead of time what needs to be corrected based on pre-existing collaboration with the first user. For example, the second user may start updating the phone number field (shown as action 580) or the company field (shown as action 590) then this may imply a behavior that the second user knows exactly which fields need to be updated. Further, the fraud detection module 320 may be configured to detect whether the actions of the second user follow a general systematic change pattern indicating a potential fraud. In such situations, the fraud detection module 320 may be configured to assess the updated results and the Internet Protocol (IP) address associated with the second user and to verify whether the second user is likely a fraudulent user.

For some embodiments, when the fraud detection module 320 detects a potential fraud, the fraud detection module 320 may introduce a time delay to prevent the second user from collecting the rewards after performing the updates to discourage the collaboration. For some embodiments, when the fraud detection module 320 determines that the second user and the associated actions may be fraudulent, an alert may be generated. The alert may be sent to a referee mechanism. For some embodiments, the referee mechanism may include a combination of one or more automated mechanism and a group of reviewers or data stewards. Based on such detection or generation of alerts, operations may be performed to freeze or stop the updates on certain records for a period of time. Correction actions may be triggered. Points or virtual currency may be adjusted to prevent the second user benefiting from the fraud.

For some embodiments, the fraud detection module 320 may be configured to use the Hadoop technique to look for general collaboration by the first user and the second user across record ids. The Hadoop technique is useful to cluster data when there is a large amount of computationally extensive data. For detecting potential collaborators, the Hadoop technique may cluster users into pairs who have acted on the same records (referred to as a "user pair"), along with the times and actions taken. Following is an example of the operations that may be performed using the Hadoop technique:

extract (Contact, Action, Time, User) (map step)
    sort by Contact, giving (Contact, (User, Action, Time), (User, Action, Time) . . . ) (shuffle)
    generate user pairs for each contact: (User1×User2, (Contact, User, Action, Time) . . . ) (reduce)
    sum by User1×User2 pair The results of the Hadoop technique may be multiple data clusters based on the above criteria (e.g., user, action, time, pairs, etc.) For some embodiments, the fraud detection module 320 may be configured to search the clusters for (Correction, Correction) pairs. Other patterns may also be used to search and detect the fraud. For example, the fraud detection module 320 may be configured to search for reversal pattern or bulk update pattern between a first user and a second user where a modification performed by the first user is updated by a second user. The fraud detection module 320 may also be configured to explicitly search for collaboration fraud by tracking record deltas on the fields that are updated and then search for symmetrical changes. For some embodiments, the fraud detection module 320 may be configured to search the clusters (from applying the Hadoop technique) specifically for a→b→a behavior, such as:

extract (Contact, Version, Values, User)
    sort by Contact, giving (Contact, (Version, Values, User) . . . )

For some embodiments, the fraud detection module 320 may be configured to expose users that may merely try to keep control of their contact information and may not engage in any other fraudulent activities, or users who merely use dummy accounts. The fraud detection module 320 may be configured to detect this behavior online using cache memory or similar distributed, in memory key-value storage/caching mechanism, such as, for example, couchbase or riak. For some embodiments, when the record id information is updated, the fraud detection module 320 may be configured to store the record id information, the time and/or date the update occurs, information about the user (e.g., userid, user name, user location, etc.) who performs the update, and the updated fields with their corresponding values in the cache, keyed to the record id corresponding to the contact information. The fraud detection module 320 may delay saving the record into the database for that period of time. For some embodiments, if the same record id information is updated again during that time and a value of a field is reversed or otherwise manipulated in a systematic way (e.g., one user may be harassing another user and simply turning all edits to nonsense), the fraud detection module 320 may be configured to create another record in the cache keyed to the userid of the user performing the updates. This may enable the fraud detection module 320 to track the number of systematic changes performed on the record in any unit of time. If the number of updates to fields of the same record exceeds a pre-defined threshold value, then an alert is generated and sent to the referee mechanism about suspicious activities. Further, if those same updates are performed by the same user, then alerts can be generated to identify the user as a fraudulent user.

FIG. 6A shows an example action history table that includes the actions performed by a group of users, in accordance with some embodiments. The table 600 may include some similar information shown the history section 505 (shown in FIG. 5) such as the version number 602, the date 603, the userid 604 and the action 605. Each line item or row of the table 600 may be referred to as a record. Even though there are multiple records, the records may be grouped into two record groups 610 and 615 identified by their unique object ID 601. The records in the record group 610 are updated by the users in the user group 620. The records in the record group 615 are updated by the users in the user group 625. As shown, the dates (creation date, change date), the version number and the actions may vary for each record and each user, and it can be difficult to correlate the all the data to detect suspicious or fraudulent actions by any of the users. For some embodiments, the fraud detection module 320 may be configured to flatten the information in the action history (table 600) in order to detect the collaborative fraud candidates. Flattening may mean combining two or more related records so that the information can be better interpreted.

FIG. 6B shows an example flattened action history table, in accordance with some embodiments. For some embodiments, the fraud detection module 320 may be configured to combine different versions of related records into an individual record so that the actions of the users can be evaluated. For example, the record 680 in FIG. 6B is the combined result of the records 630, 631 and 631 from FIG. 6A. The data group 660 in FIG. 6B shows the actions by the Nth user (user 4 and record 630 in FIG. 6A) and the N−1th user (user 3 and record 631 in FIG. 6A), the time difference (7 days, from January 24 to January 31) between those two actions, and the type of action performed by the Nth user (inactivation by user 4). The data group 665 in the same record 680 shows the actions by the N−1th user (user 3 and record 631 in FIG. 6A) and the N−2th user (user 2 and record 632 in FIG. 6A), the time difference (16 days, from January 8 to January 24) between those two actions, and the type of action performed by the N−1th user (activation by user 3). This flattened action history thus allows the fraud detection module 320 to determine that the action of user 4 is possibly a correction of the action of the user 3 who may reverse the original data on January 24. Further, the fraud detection module 320 may recognize that the correction action performed by the user 4 is only seven (7) days from the action of the user 3, indicating a possible fraud. Along the same line, the date difference between the action of the user 2 and the action of the user 3 is only sixteen (16) days, indicating possible collaboration among the users 2, 3 and 4.

The record 683 in FIG. 6B is shown with two data groups 670 and 675. The data group 670 may correspond to the records 635 and 636 of FIG. 6A. The record 683 shows the actions by the Nth user (user 3 and record 635 in FIG. 6A) and the N−1th user (user 2 and record 636 in FIG. 6A), the time difference (13 days, from January 12 to January 25) between those two actions, and the type of action performed by the Nth user (activation by user 3).

The data group 675 in the same record 683 shows the actions by the N−1th user (user 2 and record 636 in FIG. 6A) and the N−2th user (user 5 and record 637 in FIG. 6A), the time difference (216 days, from Jun. 1, 2011 to Jan. 12, 2012) between those two actions, and the type of action performed by the N−2th user (add by user 5). This flattened action history thus allows the fraud detection module 320 to determine that the actions of users 3, 2 and 5 with regards to the records 635, 636 and 637 may less likely involve fraud or collaboration among the users 3, 2 and 5 based on the length time between the actions of the users 5 and 2 and based on the type of actions performed by the users 5 and 2. However, the actions performed by the user 3 may need to be examined for possible collaboration with the action performed by the user 2 due to the short length of time (13 days) between those actions and due to the type of actions they performed (e.g., inactivate, activate).

In the example above, the fraud detection module 320 may be configured to use statistical analysis to identify suspect time range clusters using a cluster factor. For example, the cluster factor may be for all clusters having update time difference (between Nth user and N−1th user) of less than 30 days. From those clusters, the fraud detection module 320 may evaluate the actions or behaviors that may seem suspicious (e.g., a→b→a pattern described above) to identify the potential fraud. For example, a third user updating the second user's actions may be considered good behavior. The second user may be a fraudulent user in a collaborative fraud if there is strong correlation between the dates and the action of the second and the third user, indicating planned activities.

For some embodiments, the fraud detection module 320 may be configured to identify if the third user has performed correction and re-activation actions on different users. If the third user performed many such actions, the third user may be a fraudulent user. In some embodiments, the fraud detection module 320 may assess the second user's history and the percentage of actions by the second user that get corrected by the third user in a short period of time. If the percentage of systematic changes to the actions of the second user by the third user is disproportionate as compared to a set of users from a broader user base, then this may suggest that the second user and the third user have collaborated in a fraud. For example, when it is determined that an average record update performed by a user in a certain user group may amount to approximately five (5) percent of changes to the record, then the five percent may be used as a threshold level to detect potential fraud. When a user updates a record where the amount of change is more than the threshold level (e.g., 20 percent), then the action may be considered fraudulent. Depending on the type of application, the threshold level for the percentage of changes that suggest fraudulent behavior may vary.

Figure 7:
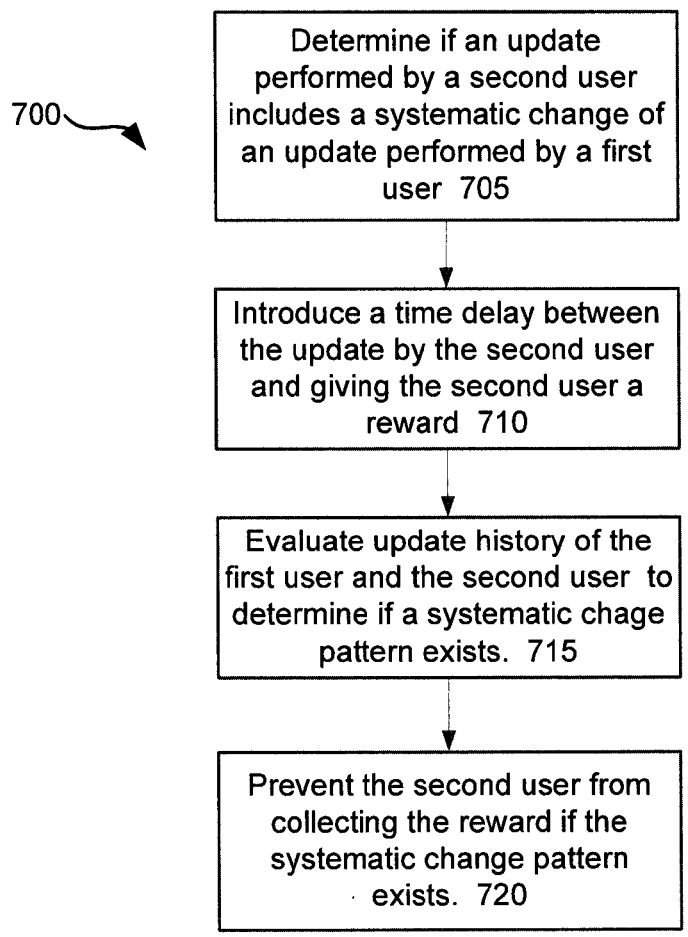
FIG. 7 shows a flowchart of an example fraud detection process, performed in accordance with some embodiments.

FIG. 7 shows a flowchart of an example fraud detection process, performed in accordance with some embodiments. In some embodiments, the method 700 may be used to prevent collaboration between a first user and a second user from fraudulently collecting gamification rewards. The method may be performed by the fraud detection module 320 (shown in FIG. 3). The gamification may be associated with an application the server computing system 255 or 260 (shown in FIG. 2).

At block 705, update actions performed by a second user are analyzed to determine if those actions include systematic changes (e.g., reversing updates) previously performed by a first user. The first user may have performed mass updates or changes and may have collected rewards for those updates. If it is determined that the actions of the second user include at least some systematic changes, then the actions may be considered fraudulent. Other factors may also be considered to differentiate whether action of the second user is fraudulent. For example, if the second user immediately performs the systematic change actions without performing other actions, then the actions may be fraudulent. Normally, the second user would be able to collect the rewards for the updates action; however, since the action of the second user is suspicious, a time delay is introduced to delay the second user from collecting the rewards, as shown in block 710. This time delay enables the fraud detection module 320 to perform further investigation.

At block 715, the update or action history of the first user and the second user is evaluated. The history may include updates performed by them over multiple records over a certain length of time. The evaluation looks for pattern of systematic changes that reflect their collaboration for the purpose of collecting the rewards. For example, when there are repeated pattern of updates performed by the first user followed by systematic change updates by the second user shortly thereafter, potential collaboration may exist. When such a pattern of repeated updates by a first user followed by a second user's updates is detected, the second user is prevented from collecting the rewards, as shown in block 720.

Figure 8A:
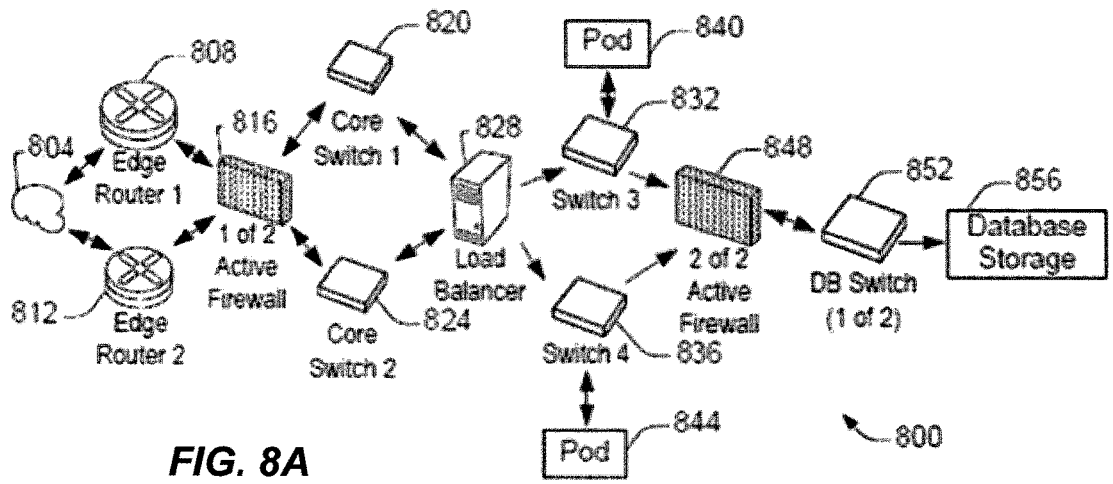
FIG. 8A shows a system diagram 800 illustrating architectural components of a fraud detection service environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
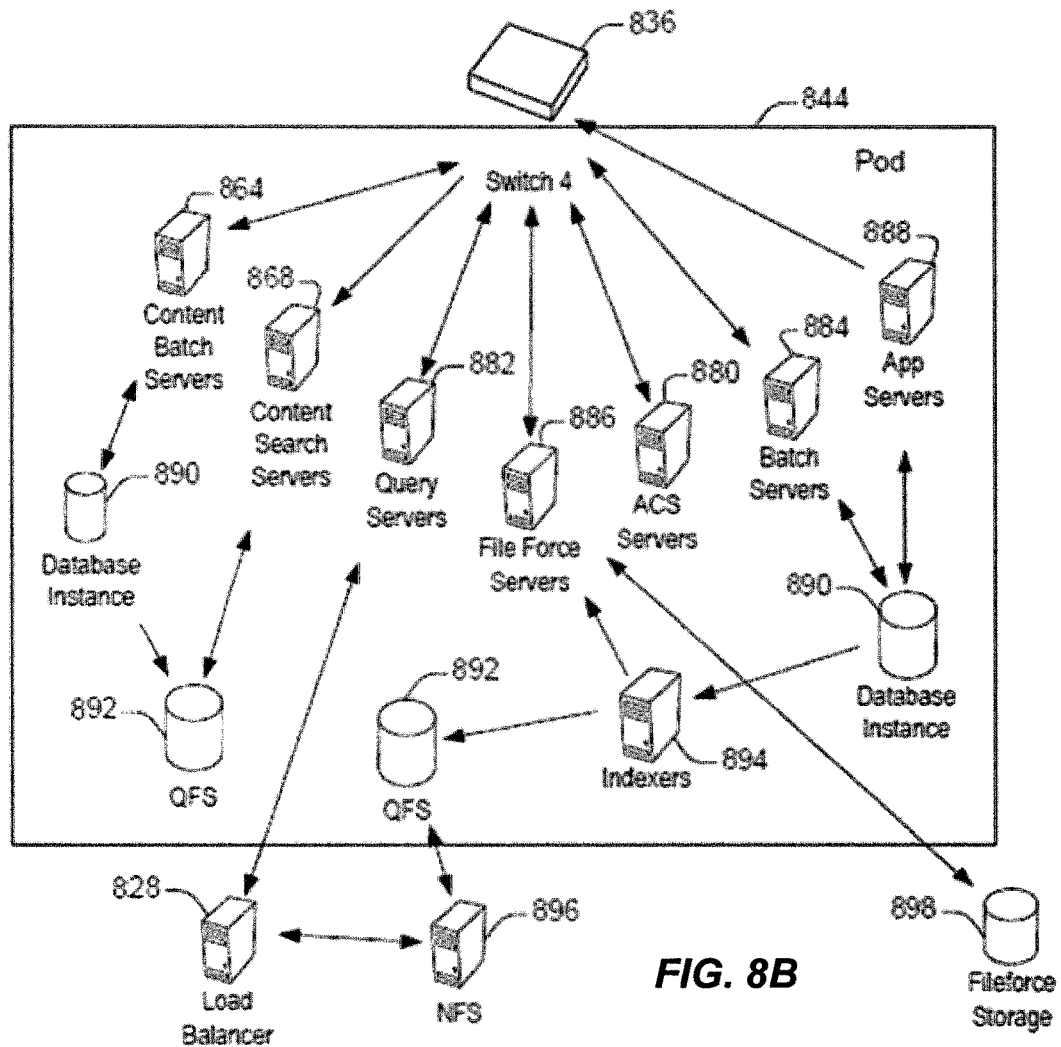
FIG. 8B shows a system diagram further illustrating architectural components of a fraud detection service environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
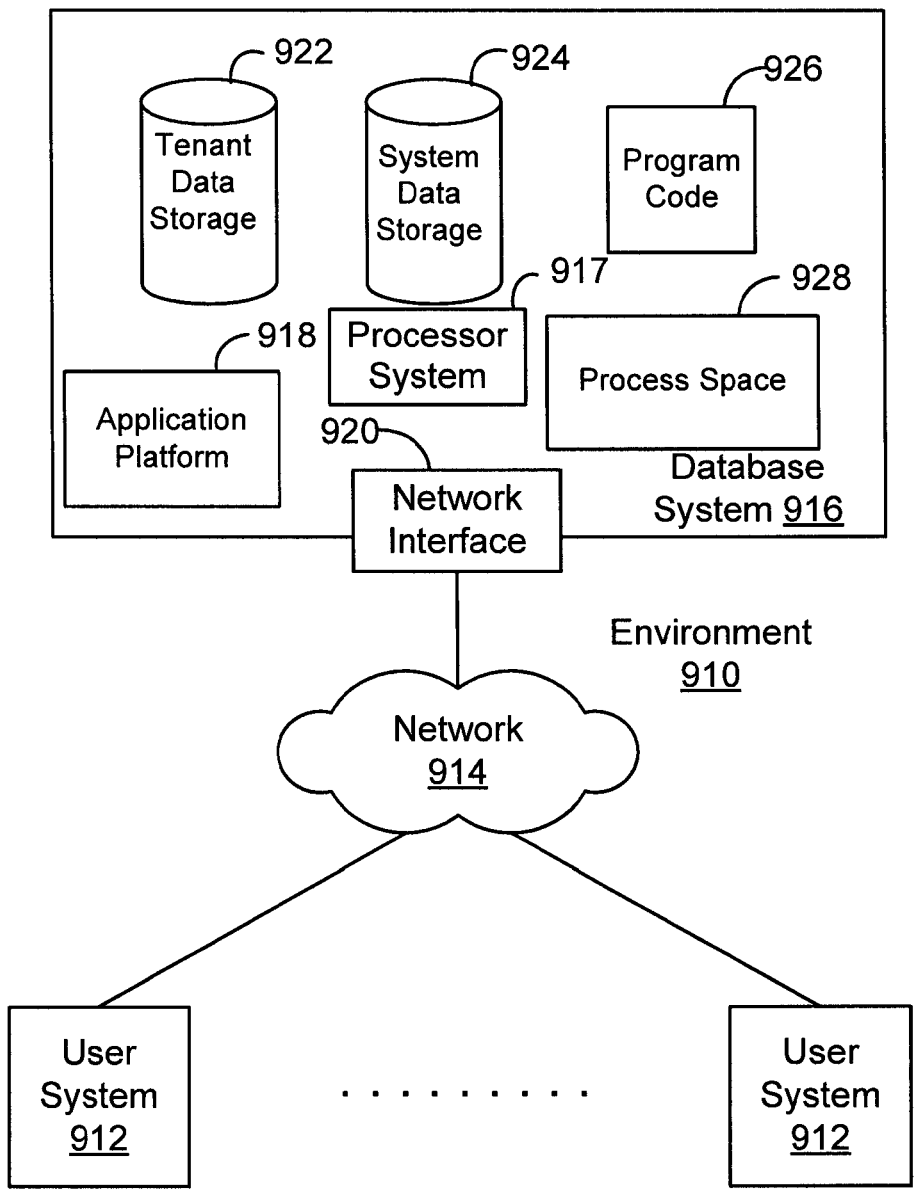
FIG. 9 shows a system diagram 910 illustrating the architecture of a multitenant database environment, in accordance with some embodiments.
Figure 10:
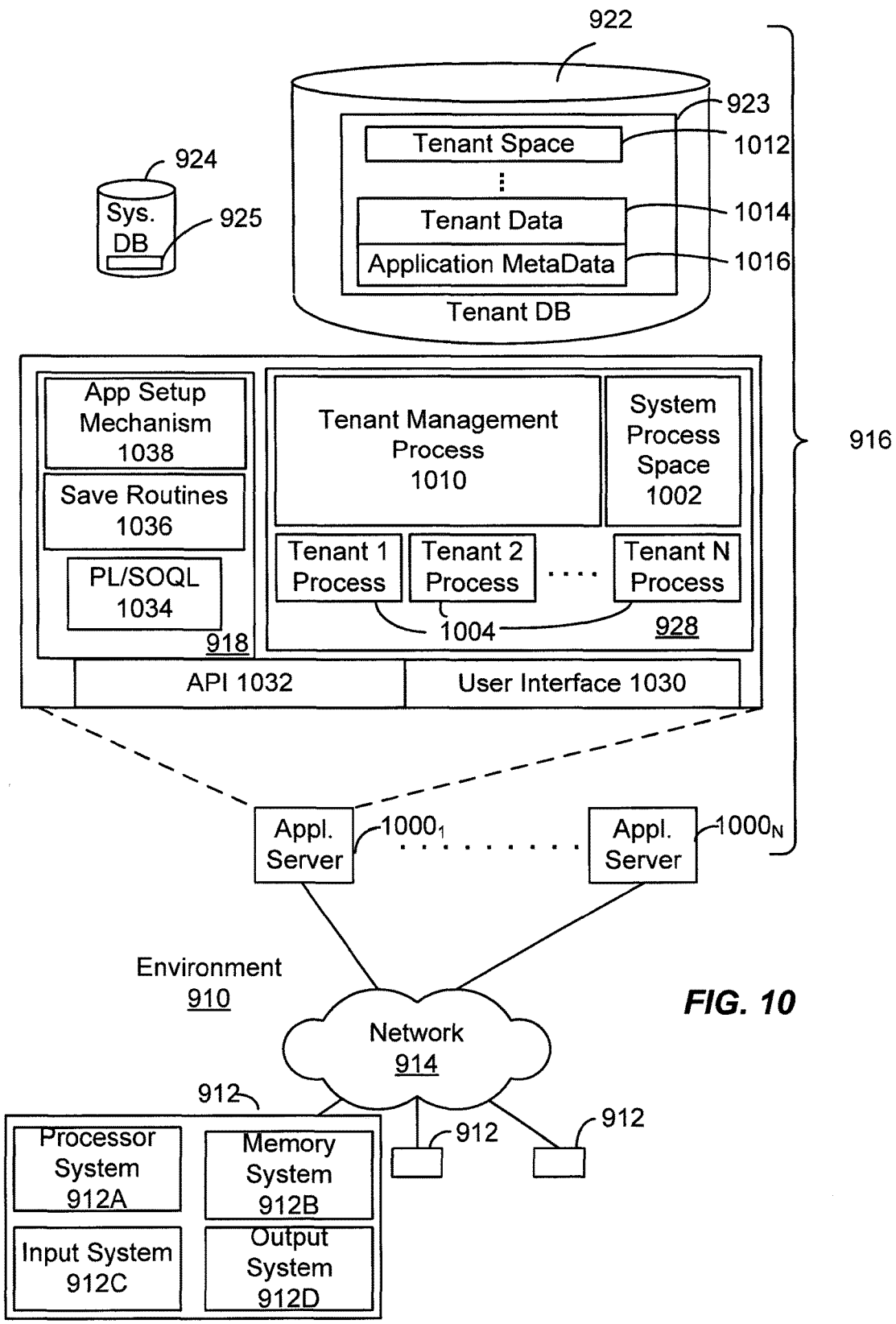
FIG. 10 shows a system diagram 910 further illustrating the architecture of a multitenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than a network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

The invention claimed is:

1. A computer-implemented method for handling gamification fraud, the method including:
receiving, by a database system, a first update to a record in a database by a first user;
receiving, by the database system, a second update to the record by a second user;
evaluating, by the database system, the second update to the record made by the second user to determine that the second update is a systematic change of the first update to the record previously made by the first user;
introducing, by the database system, a time delay between the update made by the second user and an issuance of a reward to the second user based upon the determination that the second update performed made by the second user appears to be a systematic change;
evaluating, by the database system, update history of the first user and update history of the second user to identify that the second user has made corresponding systematic changes to updates of the first user to similar records; and
preventing, by the database system, the issuance of the reward to the second user at the expiration of the time delay based upon identifying that the second user has made corresponding systematic changes to updates of the first user to similar records.

2. The method of claim 1, wherein the first update performed by the first user comprises multiple changes to multiple records, and wherein the second update performed by the second user comprises multiple systematic changes to the same multiple records.

3. The method of claim 1, wherein evaluating the update history of the first user and the update history of the second user comprises using a clustering technique to identify data clusters from the update histories by pairing the first user with the second user.

4. The method of claim 3, wherein evaluating the update history of the first user and the update history of the second user further comprises applying a time window to the data clusters to identify fraudulent activities by the first user and the second user.

5. The method of claim 4, wherein the clustering technique is a statistical analysis technique to identify the data clusters.

6. The method of claim 5, wherein the systematic change performed by the second user includes a reversal update, and wherein the clustering technique is Hadoop technique.

7. The method of claim 1, wherein evaluating the update history of the first user and the second user comprises using a flattening technique to combine related records from the update history to determine collaborative fraud committed by the first user and the second user.

8. An apparatus for handling gamification fraud, the apparatus comprising:
one or more processors; and
a non-transitory computer readable medium storing a plurality of instructions, which when executed, cause the one or more processors to:
receive a first update to a record in a database by a first user;
receive a second update to the record by a second user;
evaluate the second update to the record made by the second user to determine that the second update is a systematic change of the first update to the record previously made by the first user;
introduce a time delay between the update made by the second user and an issuance of a reward to the second user based upon the determination that the second update made by the second user appears to be a systemic change;
evaluate update history of the first user and update history of the second user to identify that the second user has made corresponding systematic changes to updates of the first user to similar records; and
prevent the issuance of the reward to the second user at the expiration of the time delay based upon identifying that the second user has made corresponding systematic changes to updates of the first user to similar records.

9. The system of claim 8, wherein the first update performed by the first user comprises multiple changes to multiple records, and wherein the second update performed by the second user comprises multiple systematic changes to the same multiple records.

10. The system of claim 8, wherein the update history of the first user and the update history of the second user comprises are evaluated using a clustering technique to identify data clusters from the update histories by pairing the first user with the second user.

11. The system of claim 10, wherein the update history of the first user and the update history of the second user further are evaluated by applying a time window to the data clusters to identify fraudulent activities by the first user and the second user.

12. The system of claim 11, wherein the clustering technique is a statistical analysis technique to identify the data clusters.

13. The system of claim 12, wherein the systematic change performed by the second user includes a reversal update, and wherein the clustering technique is Hadoop technique.

14. The system of claim 8, wherein the update history of the first user and the update history of the second user comprises are evaluated using a flattening technique to combine related records from the update history to determine collaborative fraud committed by the first user and the second user.

15. A computer program product, comprising a non-transitory computer-readable medium having a computer-readable program code embodied therein to be executed by one or more processors, the program code including instructions to:
receive a first update to a record in a database by a first user;
receive a second update to the record by a second user;
evaluate the second update to the record made by the second user to determine that the second update is a systematic change of the first update to the record previously made by the first user;

introduce a time delay between the update made by the second user and an issuance of a reward to the second user based upon the determination that the second update made by the second user appears to be a systemic change;

evaluate update history of the first user and update history of the second user to identify that the second user has made corresponding systematic changes to updates of the first user to similar records; and prevent the issuance of the reward to the second user at the expiration of the time delay based upon identifying that the second user has made corresponding systematic changes to updates of the first user to similar records.

16. The computer program product of claim 15, wherein the update performed by the first user comprises multiple changes to multiple records, and wherein the update performed by the second user comprises multiple systematic changes to the same multiple records.

17. The computer program product of claim 15, wherein evaluating the update history of the first user and the update history of the second user comprises using a clustering technique to identify data clusters from the update history by pairing the first user with the second user.

18. The computer program product of claim 17, wherein evaluating the update history of the first user and the update history of the second user further comprises applying a time window to the data clusters to identify fraudulent activities by the first user and the second user.

19. The computer program product of claim 18, wherein the clustering technique is a statistical analysis technique to identify the data clusters.

20. The computer program product of claim 15, wherein evaluating the update history of the first user and the update history of the second user comprises using a flattening technique to combine related records from the update history to determine collaborative fraud committed by the first user and the second user.

* * * * *